No. 835,247. PATENTED NOV. 6, 1906.
C. MORGAN.
SHOCK ABSORBER.
APPLICATION FILED JAN. 11, 1906.
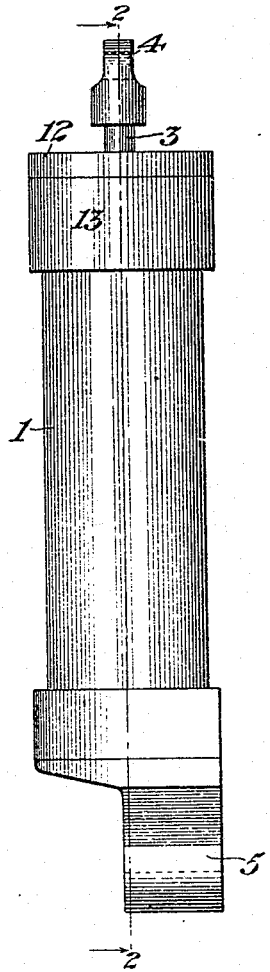
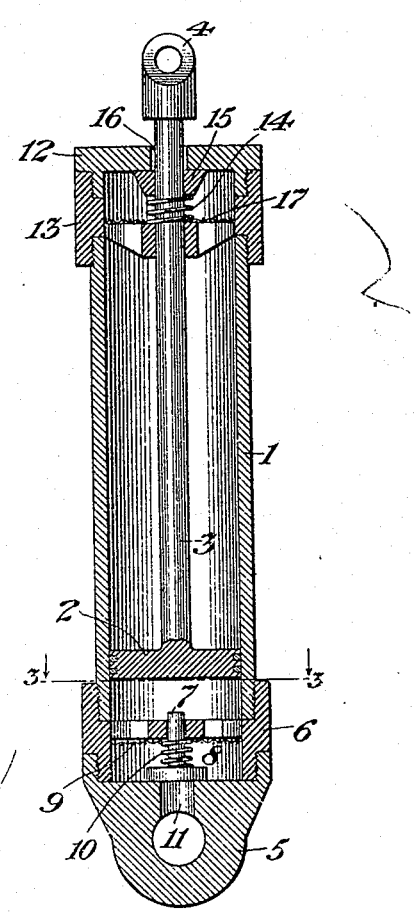
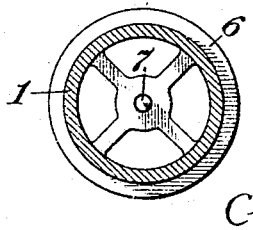
Witnesses
Chas. F. Clagett
W.<sup>m</sup> Arthur Babson
Charles Morgan, Inventor
By his Attorney Lewis J. Doolittle

UNITED STATES PATENT OFFICE.

CHARLES MORGAN, OF SOUTH ORANGE, NEW JERSEY.

SHOCK-ABSORBER.

No. 835,247.  Specification of Letters Patent.  Patented Nov. 6, 1906.

Application filed January 11, 1906. Serial No. 295,605.

*To all whom it may concern:*

Be it known that I, CHARLES MORGAN, a citizen of the United States, and a resident of South Orange, in the county of Essex and State of New Jersey, have invented certain new and useful Improvements in Shock-Absorbers, of which the following is a specification.

This invention relates to a device which is adapted to be used in connection with vehicle-springs to absorb the shock caused by the jounce of the body of the vehicle.

The springs used to support the body of the vehicle must be flexible in order to provide an easy-riding carriage, and if these springs are made sufficiently rigid or stiff to take up the jounce caused by extremely-rough roads or by passing over of some obstruction by the wheels of the vehicle they would not be sufficiently flexible to provide for the easy-riding qualities which are desirable.

In order to provide against and prevent the shock which would be caused by the body of the vehicle striking against the running-gear, I have provided a device which is adapted to be used in connection with the ordinary carriage-springs and which will furnish a cushion to absorb the shock. The device is in the form of a piston reciprocating in an air-chamber which is provided at either end with valves of suitable construction. These valves open to allow the air to flow freely into the compression-chamber when the piston moves in one direction and are closed automatically by air-pressure by the return stroke. The valves at the opposite ends of the compression-chamber operate alternately as the piston reciprocates in the chamber. A suitable connection is provided at one end of this chamber for attaching the same to the running-gear of the vehicle, and the piston is provided with a stem extending to the exterior of the opposite end of the chamber, where it is provided with a suitable connection for attaching the same to the body of the vehicle. As the vehicle jounces up and down and as the wheels pass over obstructions or rough places in the road a relative movement is set up between the piston and the compression-chamber and the air is alternately drawn in and compressed on opposite sides of said piston, thus forming an air-cushion which serves very efficiently to absorb and prevent any severe shock caused by the movement of the carriage-body and running-gear.

The valves may be so constructed as to allow a small amount of air to escape through the same when closed, and so provide a means for adjusting the cushioning effect of the air in the cylinder.

In order to provide against dust or other matter being drawn into the cylinder in which the piston operates, I have provided a screen made of wire-gauze or other suitable material, which is carried by an intermediate member, which also furnishes a guide for the piston-stem on one end and for the valve-stem on the opposite end. This insures a clean interior surface for the piston-chamber and prevents the rapid wear, which would soon cause a leakage, and so render the same inoperative, and consequently prolongs the life of the device and insures a more perfect operation.

The various features of a device embodying my invention will be more fully described in connection with the drawings accompanying this specification.

Figure 1 is a side elevation of a device such as described, adapted to be attached to a vehicle. Fig. 2 is a sectional side elevation taken on the line 2 2 of Fig. 1 looking in the direction of the arrows. Fig. 3 is a sectional plan view taken on the line 3 3 of Fig. 2 looking in the direction of the arrows.

At 1 I have shown a cylindrical housing forming the compression-chamber in which the piston 2 is operated. This piston is provided with a stem 3, which extends to the exterior of the compression-chamber, where it is provided with a suitable connection, such as 4, for connecting same with the body of the vehicle.

Located intermediary of the compression-chamber and the flange-cap 5 is an intermediate member 6, which is provided with radially-extending arms joined at their intersection, providing a guide for the valve-stem 7 of the valve 8. Openings of large size are provided between the radially-extending arms of the intermediate member 6. These openings are covered by a screen 9, which is preferably of wire-gauze, which is of such a size as to fit tightly in place and may also be held against the arms by the spiral spring 10, which operates to hold the valve 8 in its closed position. A valve-opening 11 is provided in the cap 5. At the opposite end of the compression-chamber a cap 12 is provided, and located intermediary of said cap and the compression-cylinder is an intermediate member 13, which is provided with radially-extending arms joined at their intersection, providing a guide for the piston-stem 3.

The spiral spring 14 is provided to hold the valve 15 closed against the opening 16 in the cap 12. This opening 16 is somewhat larger than the piston-stem 3, providing for the free passage of the air to the interior of the device on the downstroke of the piston. The valve-spring 14 also holds the wire-gauze 17 in place to cover the openings between the radially-extending arms of the intermediate member 13.

The valve-spring 10 at the lower end of the device serves to hold the valve 8 in position over the opening 11 and also rests upon and holds the gauze 9 in position.

The intermediate member 6 is provided with a central opening forming a guide for the valve-stem 7. The upper valve 15 is adapted to slide upon the piston-rod 3, which forms a guide for the same.

In adapting the device for use with a road-vehicle the upper end 4 is preferably attached to the body and lower end 5 to the running-gear in such a manner that when the vehicle is carrying a normal load over an ordinary road the piston 2 will stand approximately midway between the upper and lower end of the compression-chamber. When the wheels pass over an unusual obstruction, which will cause an extreme jounce, the piston will be forced downward by the movement of the body, closing the valve 8 and compressing the air in the lower portion of the chamber and at the same time opening the valve 15 at the upper end by means of the suction produced by the movement of the piston, drawing the air through the opening 16 into the intermediate chamber and from thence through the gauze 17 into the compression-chamber. Upon the return upward movement of the body the valve 15 is closed and the air is compressed in the upper portion of the chamber and at the same time the valve 8 at the lower end of the device is opened and the air is drawn in through the opening 11 to the intermediate chamber and through the gauze 9 to the lower portion of the compression-chamber. In this manner a complete air-cushion is formed which absorbs the shock caused by the extreme jounce of the vehicle, resulting in a vehicle which rides very smoothly and easily without an extreme movement of the body and completely absorbing and preventing any shock to the occupants.

The description of the operation of the device in connection with a road-vehicle is given as an illustration of the operation of the device; but it will be evident that the same will apply equally well when it is used in connection with any device or mechanism in which it is desired to limit the movement and prevent the shock caused by the sudden stoppage of the parts.

The form and construction shown and described herein is intended as an illustration merely of a preferred form of a device embodying the invention, and it will be evident that various changes in the details of the construction may be made to adapt the same to various uses without departing from the scope of my invention.

What I claim is—

1. In a shock-absorber, in combination, a primary compression-chamber located intermediary of a plurality of secondary chambers communicating therewith, said secondary chambers being separated from said primary chamber by intermediate members, one of which forms a guide for the piston-rod, valves controlling the inlet and outlet to said secondary chambers, and a piston adapted to be operated in said primary chamber.

2. In a shock-absorber, in combination, a primary compression-chamber located intermediary of a plurality of secondary chambers communicating therewith, said secondary chambers being separated from said primary chamber by intermediate members one of which forms a guide for a valve-stem, valves controlling the inlet and outlet to said secondary chambers, and a piston adapted to be operated in said primary chamber.

3. In a shock-absorber, in combination, a primary compression-chamber located intermediary of a plurality of secondary chambers communicating therewith, said secondary chambers being separated from said primary chamber by intermediate members, one of which forms a guide for the piston-rod at one end, another of which forms a guide for a valve-stem at the opposite end of said primary chamber, valves controlling the inlet and outlet to said secondary chambers, and a piston adapted to be operated in said primary chamber.

4. In a shock-absorber, in combination, a primary compression-chamber located intermediary of a plurality of secondary chambers communicating therewith, said secondary chambers being separated from said primary chamber by intermediate members one of which forms a guide for the piston-rod, valves controlling the inlet and outlet to said secondary chambers, the piston-rod forming a guide for one of said valves, and a piston adapted to be operated in said primary chamber.

5. In a shock-absorber, in combination, a primary compression-chamber located intermediary of a plurality of secondary chambers communicating therewith, said secondary chambers being separated from said primary chamber by intermediate members which form supports for screens, valves controlling the inlet and outlet to said secondary chambers, and a piston adapted to be operated in said primary chamber.

6. In a shock-absorber, in combination, a tubular member forming a compression-chamber, an intermediate member attached to one end of said tubular member and separating said compression-chamber from a secondary chamber, a cap attached to said intermediate member and forming therewith said secondary chamber, a valve controlling the inlet and outlet to said secondary chamber, and a piston adapted to be operated in said compression-chamber.

7. In a shock-absorber, in combination, a tubular member forming a compression-chamber, intermediate members attached to the opposite ends of said tubular member and separating said compression-chamber from secondary chambers, caps attached to said intermediate members and forming therewith said secondary chambers, valves controlling the inlet and outlet to said secondary chambers, and a piston adapted to be operated in said compression-chamber.

8. In a shock-absorber, the combination of a primary compression-chamber, a secondary compression-chamber, an intermediate member separating said chambers having an opening therein providing for the passage of a fluid therethrough, a screen covering said opening in said intermediate member, a valve controlling the inlet and outlet to said secondary chamber, and a piston adapted to be operated in said primary chamber to compress a fluid therein.

9. In a shock-absorber, the combination of a primary compression-chamber, a secondary compression-chamber positioned at one end of said primary chamber, an intermediate member separating said chambers having an opening therein providing for the passage of a fluid therethrough and also having an opening forming a guide for the valve-stem, a valve controlling the inlet and outlet to said secondary chamber, and a piston adapted to be operated in said chamber to compress air therein.

10. In a shock-absorber, the combination of a primary compression-chamber, a plurality of secondary chambers communicating therewith, a plurality of intermediate members separating said primary and secondary chambers each having an opening therein providing for the passage of the fluid therethrough and one of said intermediate members having in addition an opening forming a guide for the piston-stem, valves controlling the inlet and outlet to said secondary chambers, and a piston adapted to be operated in said primary chamber to compress a fluid therein.

Signed at New York, in the county of New York and State of New York, this 25th day of December, A. D. 1905.

CHARLES MORGAN.

Witnesses:
WM. ARTHUR BABSON,
WALTER H. BOND.